March 21, 1961 K. GEBELE 2,975,686
PHOTOGRAPHIC CAMERA
Filed Nov. 4, 1958
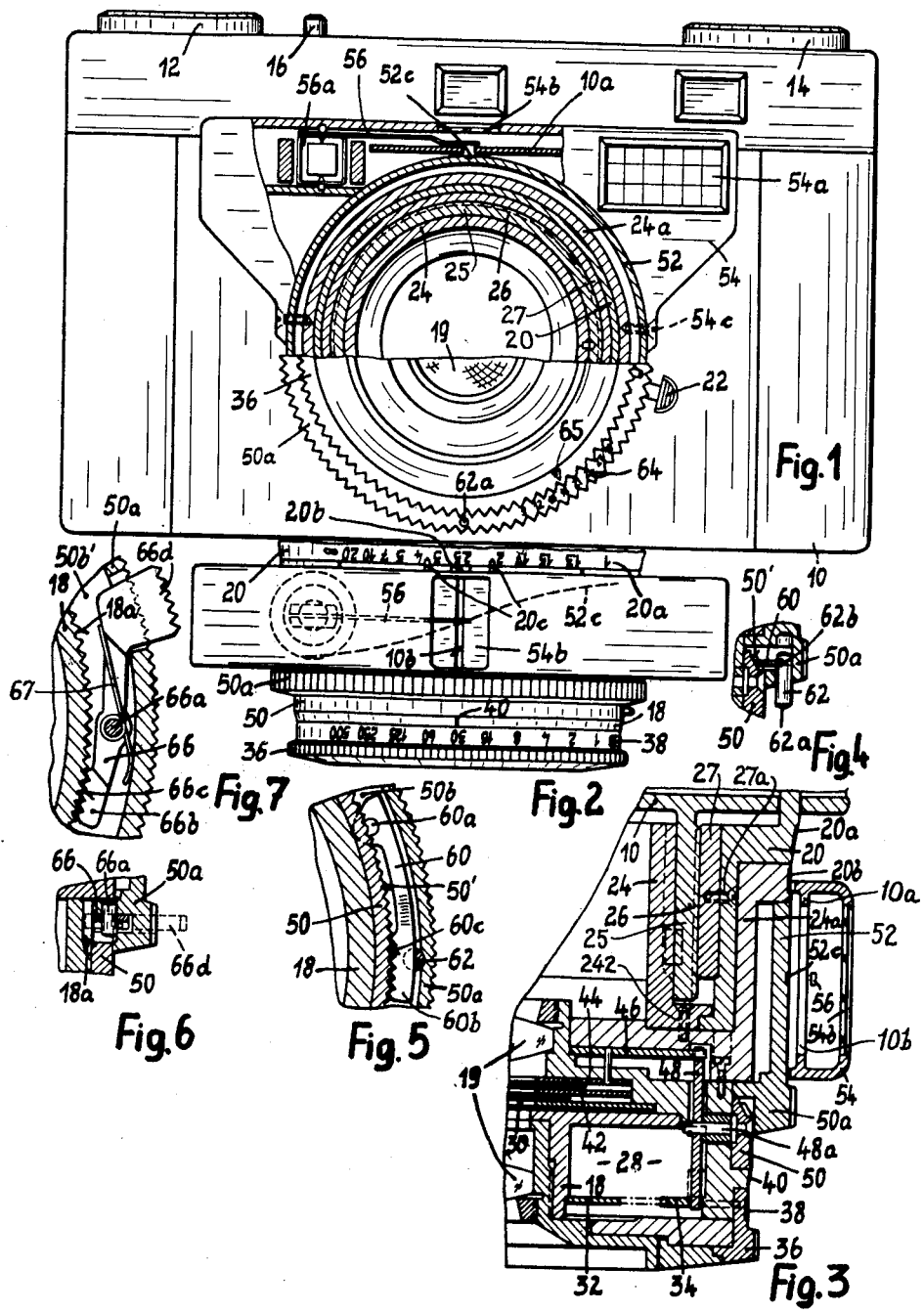

United States Patent Office 2,975,686
Patented Mar. 21, 1961

2,975,686
PHOTOGRAPHIC CAMERA

Kurt Gebele, Munich, Germany, assignor to Compur-Werk Friedrich Deckel O.H.G., Munich, Germany, a firm of Germany Filed Nov. 4, 1958, Ser. No. 771,780
Claims priority, application Germany Nov. 8, 1957
5 Claims. (Cl. 95—10)

The present invention relates to a photographic camera and, more particularly, to a film speed adjustment for a shutter of a photographic camera of the type having interconnected shutter speed and diaphragm aperture setting members actuatable by an exposure value setting member for the setting of exposure values.

An object of the invention is to provide a generally improved and more satisfactory photographic camera having a shutter of the type including an exposure value setting member which may operate interconnected shutter speed and diaphragm aperture setting members for the setting of exposure values.

Another object is the provision of a new and improved film speed adjustment mechanism for a shutter of the type described above for the setting of exposure values.

Yet another object is to provide a new and improved film speed adjustment mechanism for a shutter which is sturdy and enclosed within the shutter, so as to be relatively trouble free.

A further object of the invention is the provision of a new and improved film speed adjustment mechanism on a shutter for the setting of exposure values, wherein the film speed adjustment mechanism is normally out of sight when adjusting the camera for exposure value and shutter speed and diaphragm aperture or depth of field.

These and other desirable objects may be attained in the manner disclosed as an illustrative embodiment of the invention in the following description and in the accompanying drawings forming a part hereof, in which:

Fig. 1 is a front elevaitonal view, partly in cross section, of a camera having a shutter in accordance with the present invention;

Fig. 2 is a top view of the camera shown in Fig. 1;

Fig. 3 is a radial cross section, to an enlarged scale, of a fragment of the shutter of Fig. 1;

Fig. 4 is a radial cross section of a portion of the shutter;

Fig. 5 is a fragmentary vertical cross section, substantially perpendicular to the optical axis, of the portion of the shutter shown in Fig. 4;

Fig. 6 is a radial cross section of another portion of the shutter; and

Fig. 7 is a fragmentary vertical cross section of the other portion of the shutter shown in Fig. 6.

The same reference numerals throughout the several views indicate the same parts.

In Figs. 1 and 2 there is shown a photographic camera 10, of the type commonly known as a miniature camera, having a shutter 18 constructed in accordance with the principles of the present invention. The shutter 18 may be incorporated in cameras of various kinds, however as shown, the camera 10 includes a film winding knob 12 preferably of the type which cocks the shutter as the film is moved forward, a rewind knob 14, and a shutter release 16. The structure and operation of the knobs 12 and 14 and the shutter release 16 may be of any suitable type. The shutter indicated in general at 18 is more specifically an objective shutter, and this shutter and the lens associated with it, are displaceable along the direction of the optical axis for the purposes of focusing, for which focusing movement any suitable type of arrangement may be employed, such as the one to be described. As better shown in Fig. 3, a pair of axially spaced lens elements 19 are carried by the shutter, and a plurality of shutter blades 30 and diaphragm leaves 42 are arranged between the pair of lens elements 19 and are settable in a manner to be explained.

To mount the shutter 18 for adjustment along the optical axis for the purpose of focusing, the front wall of the camera 10 is provided with a short forwardly extending stationary tube 25 having on its outer surface a helical screw thread 26. Interengageable with the thread 26, to form a focusing drive, is a corresponding internal thread carried by a ring 27 which is fixed by screws 27a to the focusing or distance setting ring 20, the ring near its rear end bearing a focusing or distance scale 20a graduated circumferentially on the outer perimeter of the focusing ring 20 and marked in any convenient units of distance, such as meters or feet. The ring 20 may be turned for focusing by directly grasping the accessible rear bottom part of the ring or, more conveniently, by grasping a handle 22 which is fixed to the ring 20 and extends radially outwardly to a readily accessible position.

A mounting tube 24 fits snugly but slidably within the stationary tube or flange 25, and is keyed thereto to prevent rotation while leaving it free to move axially, in the direction of the optical axis. Fixed to the front end of the mounting tube 24, as by screws 242, is an annular mounting member 24a having a front wall whose rear face fits against the front end of the mounting tube 24 and having a side wall or skirt which surrounds most of the axial length of the focus setting ring 20. An inwardly extending annular flange at the forward end of the ring 20 is snugly but rotatably engaged between the front wall of the member 24a and a lip on the member 24, so that any axial movements of the focus adjusting ring 20 (caused by turning the ring 20 and axial travel thereof on the threads 26) will cause corresponding axial movements of the parts 24 and 24a, but without any rotation of these last mentioned parts.

At the rear end of the mounting member 24a is an outwardly extending radial flange or rim which bears a reference point or stationary index mark 20b which cooperates with the scale 20a to provide a focusing distance indication. The housing of the shutter 18 is secured to the front surface of the front wall of the mounting ring 24a.

The shutter 18 is of the annular cylindrical type having an aperture setting member and a shutter speed setting member which are differentially interconnected with an exposure value setting ring for the setting of exposure values. This type of shutter is disclosed in the copending patent application of K. Gebele and F. Singer, Serial No. 707,796, filed January 8, 1958. This patent application should be referred to for a complete disclosure and understanding of a shutter to be described here more briefly, since only those portions of the shutter which are essential to the understanding of the present invention will be described. The shutter speed is adjusted by means of a cam ring 32 which is operatively coupled with a setting ring 34, which is in turn connected with an outer shutter speed setting ring 36 mounted rotatably on the outer surface of the shutter casing 18. The driving connection between the rings 32, 34, and 36 may be effected by radial arms engaging in intermating driving slots, such as is illustrated in Fig. 2 of the aforementioned patent application. The present ring 32 may correspond to the cam ring 22 disclosed in the prior application, and the present ring 34 may correspond to the ring 24 of the prior patent application. The ring 32 and a portion of the ring 34 are arranged within the annular space 28 within the shutter housing 18, the connection between the rings 34 and 36 extending through an appropriate circumferential slot in the outer wall of the shutter casing. The mechanism for driving the shutter blades 30 is of known form and is arranged in the annular space 28. This mechanism, and the connection between the cam ring 32 and the shutter blade driving mechanism, are not here shown, but may take the form discussed in the aforementioned patent application. A shutter speed scale 38 is graduated circumferentially on the shutter speed setting ring 36, and is read in conjunction with a mark 40 inscribed on the outer wall of the shutter casing 18. Although not here shown, the setting ring 36 is provided with a suitable mechanism for preventing its free rotation, so that the particular shutter speed setting which is selected is held frictionally in place. This mechanism may take the form of a conventional click stop, or may be of the spring urged ball type such as disclosed in Fig. 5 at 134' in the aforementioned patent application.

To adjust the diaphgram leaves 42, a diaphragm control ring 44 is provided and is operatively coupled with a diaphgram setting ring 46. These two rings together may correspond to the ring 30 in Fig. 2 of the aforementioned patent application. According to the present invention, the diaphragm aperture setting ring 46 is not directly connected to any externally accessible setting member, and the shutter is not provided with any scale or indication from which the size of the aperture can be read. Instead, all necessary information resulting from the size of the diaphragm aperture or necessary for setting the aperture (without having to know the size which has been or is being set) can be ascertained from the exposure meter mechanism as described below and from the depth of field indicator pointers 20c, Fig. 2, which indicate the depth of field on the distance focusing scale 20a. The connections for driving the pointers 20c from the ring 46 are not here shown, and may take the form described in the aforementioned patent application, which refers in turn to the depth of field mechanism disclosed in applications Serial Nos. 555,964 (now Patent 2,926,-588, granted March 1, 1960) and 562,346 (now Patent 2,949,835, granted August 23, 1960) and 562,872 (now abandoned).

The rings 34 and 46 are coaxial and are provided with identical sun teeth on their peripheries. Engaged with these teeth is a toothed planet gear 48 arranged so that its plane is tangential to the optical axis of the shutter 18. The planet gear 48 may correspond with the planet gear 38 disclosed in Fig. 1 of the aforementioned patent application, and serves as an equalizing or differential gearing, by means of which the two setting members are coupled to each other. The planet gear 48 is mounted on a pin 48a, the other end of the pin being secured to an exposure value setting ring 50 which is rotatably mounted on the outside surface of the outer wall of the shutter casing 18. The pin 48a, of course, extends through a slot in this outer wall, the slot having a length at least as great as that of the range of adjustment of the setting ring 50. The ring 50 may correspond with the control ring 40 disclosed in this aforementioned patent application.

In accordance with the invention, the ring 50 which carries the planet gear 48 is coupled with an additional auxiliary exposure value setting ring 50a, and the two exposure value setting rings 50 and 50a are releasably coupled together to provide a film speed adjustment. The rear portion 52 of the auxiliary exposure value setting ring 50a is in the form of a substantially cylindrical skirt or flange which surrounds most of the length of the mounting ring 24a, and the front portion of the ring 50a includes an inwardly extending flange which lies in front of the ring 24a and is engaged between the mounting ring 24a and the setting ring 50 and abuts the shutter casing 18 to rotate thereon, the extreme front end of the ring 50a overlying the outer surface of the ring 50. A film speed scale 64, as shown in Fig. 1, is provided on one of the rings 50 and 50a, and an indicator or mark 65 is provided on the other of the rings. As shown, the film speed scale 64 is graduated circumferentially around the forwardly facing end of the ring 50a and is graduated in units of film speed of any convenient type. The scale 64 preferably has graduations such that the angle from one graduation to the next corresponds to the angular separations of the graduations of the shutter speed scale 38. The reference mark 65 is carried by the side of the setting ring 50, but is shown diagrammatically in Fig. 1 for the sake of understanding although it would not actually be visible from the direction of Fig. 1. A releasable coupling of a type to be described in more detail later is provided between the rings 50 and 50a to facilitate the setting of the described film speed graduation opposite the mark 65. Thus, after setting the appropriate film speed, the rings 50 and 50a are releasably locked together and rotate as a unit when a knurled raised rim on the ring 50a is grasped and turned for the setting of exposure values.

To set exposure values, a photoelectrically operated exposure value meter is provided having a pointer, and a follow-up member is provided on the ring 50a to be brought into alinement with the pointer. Various types of exposure value meters may be employed, however as shown, the meter is contained within a horseshoe shaped housing 54 which is releasably secured to the camera 10. The lower side of a housing 54 is arcuate in shape and rests on the mounting ring 24a and the setting ring 50a, being removably fastened to the mounting ring 24a by means of appropriate fasteners such as the screw fasteners 54c. The housing 54 includes a window 54a for the photoelectric cell, and the current generated by light impinging upon the cell is conducted to a moving coil instrument 56a having a pointer 56.

To provide a follow-up member, the ring 50a has suitably marked on its outer surface a follow-up curve or indication 52c, milled in the periphery of the ring 50a and brightly colored so as to be conspicuous. All but a small portion of the curve 52c is covered up by a wall member 10a having a centrally located slot 10b extending approximately parallel to the optical axis. In operation, the pointer 56 moves to a position in accordance with the light impinging upon the photocell, and the ring 50a is rotated until the portion of the curve 52c appearing through the slot 10b is alined with the pointer 56. A window 54b is provided in the top wall of the housing 54 above the slot 10b to observe this alinement. The follow-up curve 52c is arranged such that it can bridge over the entire range of angular displacement of the pointer 56, and in addition it is also dimensioned so that it adapts the linearity of the exposure value arrangement on the shutter and therefore the linearity of the shutter speed and diaphragm setting rings to the nonlinearity of the exposure value meter indications. In this way it is possible to simply have the curve mark 52c upon the adjustment of the exposure value follow the deflection of the exposure meter pointer without it being necessary to take into consideration any guide lines or other expedients, as are employed by other prior art devices, in connection with the setting.

The releasable coupling device between the rings 50 and 50a is shown in greater detail in Figs. 4 and 5. The rear edge of the exposure value setting ring 50, at the outside is beveled inwardly and the adjacent portion of the overlying ring 50a is shaped so as to provide a recess 50b between the two rings. It is to be noted that the recess 50b is enclosed between the two rings, since the outermost rim of the setting ring 50a overlies and abuts the outer surface of the ring 50. The beveled edge of the ring 50 is provided with a plurality of beveled teeth 50'. A suitable releasable connection is provided between these teeth 50' and a latch member carried by the ring 50a. The latch member preferably takes the form of a leaf spring 60 which is fastened at one end to the ring 50a by means of a pin 60a. The other end 60b of the leaf spring 60 is provided with a plurality of inwardly facing teeth 60c designed to mate with the teeth 50'. The teeth 60c and 50' are normally held in engagement by the natural resilience of the leaf spring 60, and are arranged to be disengaged by displacement of the end 60b of the leaf spring parallel to the optical axis to move the teeth 60c out of engagement with the teeth 50'. To this end, there is a release pin 62 extending in the direction of the optical axis through an aperture in the setting ring 50a so that its front end 62a is accessible for manual operation. Near its rear end, the pin 62 has a lateral notch 62b engaging one edge of the leaf spring 60. Thus, by depressing the end 62a with the finger, the end 60b of the leaf spring 60 is deflected to move the teeth out of engagement. At this time, the ring 50a may be rotated relative to the ring 50 and a new position of coupling may be secured by alining the selected film speed number on the scale 64 with the indicating mark 65. Upon releasing the finger pin 62, the coupling is reengaged.

As shown in Fig. 1, the film speed scale 64 and the co-operating mark 65 are preferably arranged so that they are out of sight when the shutter speed scale and the focusing distance scale are observed. Of course, it is desirable to have these latter scales visible from the top of the camera. Therefore, the film speed scale 64 is arranged on a lower portion of the ring 50a, and the manually operable finger pin 62 is conveniently located close by.

A releasable locking device is desirably provided to hold the exposure value setting rings 50 and 50a at a particular exposure value setting. A latching device of this type is shown in Figs. 6 and 7, and this device operates to lock the setting rings 50 and 50a in a particular angular position relative to the shutter housing 18. A cavity or recess 50b' is provided in the ring 50a adjacent the housing 18. A double armed lever 66 is mounted within the recess 50b' on a pin 66a fastened to the ring 50a. On one side of the pivot 66a, the lever end 66b is provided with a plurality of teeth 66c which are interengageable with a plurality of similar teeth 18a formed in the outer surface of the shutter casing 18. On the other side of the pivot, a finger piece 66d is provided and extends through an aperture in the ring 50a so as to be accessible from the outside. The lever 66 is spring urged by a spring 67 into a position with the teeth 66b and 18a interengaged. By manually depressing the finger piece 66d, the lever is swung to disengage the teeth, whereupon the exposure value setting rings 50a and 50 may be adjusted.

In the operation of the camera 10, the film transport or winding knob 12 is rotated to move the film forward and also to cock the shutter or its main drive member. The proper film speed is set by depressing the finger pin 62 to move the teeth 60c on the leaf spring 60 out of the beveled teeth 50'. The ring 50a is rotated until the appropriate film speed is opposite the mark 65 carried by the ring 50. Upon releasing the finger pin 62, the rings 50 and 50a are again coupled together for joint rotation. The particular manner of setting shutter speed and depth of field depends on the type of picture to be taken, so that in some cases it is necessary to have a particular shutter speed, whereas in other cases the depth of field is important or neither factor need be any special value. In the case that a particular shutter speed is desired, the selected shutter speed is set by rotating the shutter speed setting ring 36 until the selected speed is opposite the mark 40. Of course, if the particular shutter speed is immaterial (e.g., if the picture is to contain no moving objects) this step is not performed and the setting of the exposure value is made with regard to whatever particular shutter speed happens to be set on the camera at the moment.

The photographer now positions the camera with the window 54a of the photoelectric exposure value meter directed toward the object to be photographed in order to determine by means of the exposure meter the exposure value corresponding to this new picture. The pointer 56 of the moving coil instrument 56a is deflected to a position which is observable by the operator through the window 54b. The exposure value is set on the shutter by turning the auxiliary exposure value setting ring 50a, which is now coupled with the ring 50, until the portion of the follow-up curve 52c which is observed through the slot 10b is brought into alinement with the pointer 56. Prior to rotating the rings 50 and 50a, the locking device between the ring 50a and the shutter housing 18 must be released. Thus, the operator depresses the finger piece 66d to bring the teeth 66c out of engagement with the teeth 18a. The finger piece 66d may be held depressed with the finger of one hand as the setting rings 50 and 50a are rotated by another finger of the same hand or the other hand. When the pointer 56 and mark 52c are in alinement, the finger piece 66d is released, and the teeth 66c and 18a reengage under the action of the spring 67. Upon this rotation of the exposure value setting rings 50 and 50a, the planet gear 48 is shifted. Since the shutter speed setting ring 36 is frictionally held in the setting position in which it is at the time, only a displacement of the diaphragm setting ring 46 and the control ring 44 takes place thereby to adjust the setting position of the diaphragm leaves 42. The exposure value is now set on the camera.

When the pair of shutter speed and diaphragm aperture values resulting automatically from the exposure value setting are not to the liking of the operator, he can select a different pair by turning the shutter speed setting ring 36. The particular diaphragm aperture value set is not readable directly as such, but the depth of field is indicated by the movable pointers 20c which are readable in connection with the focusing distance scale 20a. If either the shutter speed or depth of field is inappropriate, a new set of values appears when the shutter speed setting ring 36 is rotated, it being recalled that the planet gear 48 is held in its set position by means of the locking lever 66 acting on the setting ring 50a. The rotation of the planet gear 48 transmits the movement of the shutter speed setting ring 36 to the diaphragm aperture setting ring 46 by the same angular amount, whereby during this selection of a pair of values of shutter speed and diaphragm aperture, the previously set exposure value remains unchanged. At some point during the setting procedure, of course, the operator sets the proper focusing distance on the scale 20a with reference to the stationary mark 20b. When the shutter speed and the indicated range of depth of field or definition as pointed out by the pointers 20c are acceptable to the photographer, the picture is ready to be taken, and the shutter release 16 may now be actuated.

To reset the film speed, which ordinarily need be done only when the camera is loaded with a fresh roll of film having a different speed rating from that of the roll previously used, the operator need merely depress the finger pin 62 and, after the release of the leaf spring 60, turn the ring 50a until the new film sensitivity value is read off according to the indication of the mark 65. It is to be recalled that the scale 64 in this connection has graduations such that the angle from one graduation mark to the next corresponds to the angular amount of the shutter speed scale 38.

The detachable coupling in accordance with the invention between the main exposure value setting ring 50 and the auxiliary exposure value setting ring 50a, which coupling serves for the setting of the film speed, results in various advantages. The exposure meter is simplified since it is not necessary to additionally take this factor into consideration. Instead of cumbersome means in the circuit of the photocell which, for instance, controls the current intensity, the film speed adjustment can in accordance with the invention be effected by means of a simple mechanical latch which is of low manufacturing cost and which is conveniently located between the two exposure value setting rings. This releasable coupling or latch can be manufactured to make a strong connection and, as a result of the arrangement in the space between the two setting rings, also forms a self enclosed unit which is not accessible from the outside. In this way there results a dust-proof device which is protected against injury. It can be simply operated by merely depressing the finger pin 62 manually, the recoupling taking place automatically as the finger pin is released.

By the arrangement of the film speed scale and mark on the rings 50 and 50a on the lower side of the shutter, approximately diametrically opposite the shutter speed scale and depth of field scale, the advantage is obtained that the film speed scale is out of sight during the setting of the other factors on the camera. As the film speed is ordinarily seldom changed, as for instance when changing film, this arrangement leads to less confusion when setting the camera, particularly for the inexperienced photographer.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera having a shutter including a shutter speed setting member and a diaphragm aperture setting member, means for differentially interconnecting said setting members, means for setting said setting members to an exposure value, said last named means including a first exposure value setting member for the setting of exposure values, an auxiliary exposure value setting member coaxial with and partially overlying said first exposure value setting member, a film speed scale carried by one of said exposure value setting members and an indicator carried by the other of said exposure value setting members, means defining a recess between said exposure value setting members, and releasable coupling means mounted within said recess for coupling said exposure value setting members together for joint rotation at a selected film speed position, said exposure value setting members being rings coaxial with the optical axis of the shutter, said releasable coupling means including a displaceable latch member carried by one of said rings, and interengaging teeth carried by said latch member and the other of said rings for mutual engagement in one position of said latch member, photoelectrically operated exposure meter means having a pointer, and a follow-up curve mark carried by said auxiliary exposure value setting ring for the setting of exposure values.

2. A photographic camera including a shutter having a shutter speed adjusting member, a diaphragm aperture adjusting member, and an exposure value setting member all operatively connected to each other and all rotatable about the optical axis of the shutter as a common center of rotation, said exposure value setting member having a portion of its periphery of substantially cylindrical form concentric with said optical axis, a photoelectric light meter having a movable pointer swingable in a general direction parallel to said optical axis and overlying said cylindrical portion of the periphery of said exposure value setting member, and a light value follower curve marked circumferentially on said cylindrical portion of said periphery, different circumferential portions of said curve being in different positions axially of said cylindrical portion and so arranged that for any given position of said pointer of said light meter, said exposure value setting member may be turned to a position to bring a portion of said curve into alinement with a predetermined portion of said pointer.

3. A construction as defined in claim 2, further including a stationary mask overlying said cylindrical portion and having an observation slot extending approximately parallel to said optical axis, said mask serving to obscure said curve except the portion thereof immediately underlying said observation slot, said pointer of said light meter swinging in a general direction parallel to said observation slot.

4. A photographic camera including a camera body, an objective shutter having a housing with a portion thereof of generally cylindrical form substantially concentric with the optical axis of the shutter and secured in non-rotative position on said camera body, an exposure meter casing of generally saddle shape including a downwardly concave bottom portion fitting over and secured to the upper part of said cylindrical portion of said shutter housing, an exposure meter including a photocell mounted in said meter casing and a movable pointer also mounted in said meter casing and operatively connected to said photocell to be powered thereby, an observation window in the top of said meter casing through which a portion of said pointer may be seen by an operator looking downwardly from above, and an exposure value setting member rotatable with respect to said shutter housing about said optical axis as a center, said setting member having a portion having a follower mark thereon in position to be seen through said observation window of said meter casing, the parts being so arranged that when setting the exposure value of the shutter, the operator may look downwardly through said observation window of said meter casing and may turn said exposure value setting member until said follower mark is in predetermined relation to said pointer.

5. A construction as defined in claim 4, in which said shutter housing is mounted for axial focusing movement relative to said camera body, and in which said exposure meter casing moves axially with said shutter housing when the latter moves during focusing.

References Cited in the file of this patent

UNITED STATES PATENTS

| | | |
|---|---|---|
| 2,117,429 | Kuppenbender | May 17, 1938 |
| 2,343,690 | Mihalyi | Mar. 7, 1944 |
| 2,358,084 | Mihalyi | Sept. 12, 1944 |
| 2,590,161 | Dorsey | Mar. 25, 1952 |
| 2,596,328 | Dorsey | May 13, 1952 |
| 2,630,049 | Stein | Mar. 3, 1953 |